(12) United States Patent
Kishi et al.

(10) Patent No.: US 6,596,373 B1
(45) Date of Patent: Jul. 22, 2003

(54) EPOXY RESIN COMPOSITION FOR FIBER-REINFORCED COMPOSITE MATERIAL PREPREG, AND FIBER-REINFORCED COMPOSITE MATERIAL

(75) Inventors: Hajime Kishi, Ehime (JP); Hiroaki Ninomiya, Ehime (JP); Junko Kawasaki, Ehime (JP)

(73) Assignee: Toray Industries, Inc., Tokyo (JP)

( * ) Notice: Subject to any disclaimer, the term of this patent is extended or adjusted under 35 U.S.C. 154(b) by 123 days.

(21) Appl. No.: 09/857,379

(22) PCT Filed: Oct. 6, 2000

(86) PCT No.: PCT/JP00/06983

§ 371 (c)(1),
(2), (4) Date: Jun. 5, 2001

(87) PCT Pub. No.: WO01/27190

PCT Pub. Date: Apr. 19, 2001

(30) Foreign Application Priority Data

Oct. 13, 1999 (JP) ............................................ 11-290994
May 16, 2000 (JP) ...................................... 2000-143214

(51) Int. Cl.⁷ ................................................. B32B 3/12
(52) U.S. Cl. ........................ 428/116; 428/73; 428/365; 428/375; 428/396; 428/394; 428/293.4; 428/295.1; 428/296.4; 525/107
(58) Field of Search .......................... 428/116, 73, 72, 428/68, 174, 178, 365, 375, 396, 394, 293.4, 295.1, 596.4; 525/107

(56) References Cited

U.S. PATENT DOCUMENTS 6,045,898 A * 4/2000 Kishi et al.
6,399,199 B1 * 6/2002 Fujino et al.

FOREIGN PATENT DOCUMENTS

| EP | 193082 | 9/1986 |
|---|---|---|
| EP | 351025 | 1/1990 |
| EP | 463866 | 1/1992 |
| EP | 927737 | 7/1999 |
| JP | 9-132636 | 5/1997 |
| JP | 9-143249 | 6/1997 |
| JP | 10-45925 | 2/1998 |
| JP | 2000-254917 | 9/2000 |

* cited by examiner

Primary Examiner—Deborah Jones
Assistant Examiner—Wendy Boss

(57) ABSTRACT

The present invention relates to an epoxy resin composition for a fibre reinforced composite material, which is thermosetting resin composition where the glass transition temperature Tg of the cured material obtained by heating for 2 hours at 180° C. is at least 150° C., and the modulus of rigidity $G'_R$ in the rubbery plateau in the temperature region above the aforesaid Tg is no more than 10 MPa. In accordance with the present invention, it is possible to provide a fibre-reinforced composite material which is outstanding in its resistance to hot-wet environmental condition, impact resistance, and strength characteristics such as tensile strength and compression strength, and furthermore it is possible to provide a thermosetting resin composition and a prepreg outstanding in terms of their peel strength to a honeycomb core.

20 Claims, 2 Drawing Sheets

EPOXY RESIN COMPOSITION FOR FIBER-REINFORCED COMPOSITE MATERIAL PREPREG, AND FIBER-REINFORCED COMPOSITE MATERIAL

TECHNICAL FIELD

The present invention relates to an epoxy resin composition, to prepreg and to fibre-reinforced composite materials. More particularly, it relates to prepreg, fibre-reinforced composite materials and honeycomb sandwich panels, and to the epoxy resin composition employed as the matrix resin therein, favourably used in the production of structures where, as advanced composite materials, high levels of compression/tensile strength and tensile/flexural modulus are demanded, together with high levels of specific strength and specific modulus comprising these properties divided by specific gravity.

TECHNICAL BACKGROUND

Fibre-reinforced composite materials have outstanding mechanical properties and are widely used in aircraft, in motor vehicles and in industrial applications but, as their applications have become more and more diverse, so have the property requirements placed on them.

Fibre-reinforced composite materials are heterogeneous materials in which the essential constituents are reinforcing fibre and matrix resin, and so there are considerable differences between the properties in the fibre axial direction and the properties in other directions. Thus, the resistance to a drop-weight impact is governed by the interlaminar delamination strength which is determined for example by the interlaminar edge delamination strength, so it is well known that merely increasing the strength of the reinforcing fibre does not lead to fundamental improvements. In particular, fibre-reinforced composite materials in which the matrix resin is a thermosetting resin reflect the low toughness of the matrix resin and tend to show ready failure in the case of stresses applied in other than the fibre axial direction. Hence, in addition to improving the properties in the fibre axial direction, various techniques have been proposed with the objective of improving the composite material properties in directions other than that of the fibre axis.

As a means for enhancing the toughness of the thermosetting resin itself, there is disclosed in U.S. Pat. No. 4,656,208 the addition of an aromatic thermoplastic resin oligomer to the epoxy resin, and it is said that impact strength of the fibre-reinforced composite material is also improved.

Furthermore, in U.S. Pat. No. 3,472,730 (1969), there is disclosed the improvement of the interlaminar delamination strength by providing a separate exterior film comprising an elastomer-modified thermosetting resin at one or both faces of a fibre-reinforced sheet.

However, not only is the improvement effect in terms of the interlaminar delamination strength and the like inadequate, these methods also each have their own disadvantages.

In the method of enhancing the resin toughness by the addition of an aromatic thermoplastic resin such as a polysulphone, an increase in the resin viscosity is unavoidable, so that either the impregnation of the fibre is inadequate or, alternatively, prepreg thoroughly impregnated with resin is inferior in its handling characteristics in that its drape is unsatisfactory. Furthermore, as the amount of thermoplastic resin is increased, the solvent resistance of the cured product is reduced.

Moreover, in the method in which there is interposed film containing elastomer-modified thermosetting resin, as the elastomer content is increased so the heat resistance of the composite material obtained falls considerably while, conversely, as the elastomer content is reduced so there is a marked deterioration in the interlaminar delamination strength improvement effect.

As an attempt to resolve such problems, prepregs have been proposed with resin fine particles dispersed at the surface. For example, in U.S. Pat. No. 5,028,478, there is disclosed a technique for providing a tough composite material of good heat resistance using fine particles of a thermoplastic resin such as nylon.

However, in the method disclosed in U.S. Pat. No. 5,028,478, because of the high dependence on the toughness of the thermoplastic resin itself, when the composite material is exposed to severe environmental conditions for a long time, and/or when there is poor affinity between the fine particles of thermoplastic resin and the bulk resin, interfacial separation between the bulk resin/fine particles is brought about and there is a danger of a considerable lowering in the toughness between layers.

In European Unexamined Patent Publication Nos 377,194 and 392,348, there are disclosed techniques for providing a composite material which is outstanding it its heat resistance and toughness by using thermoplastic resin fine particles of polyimide or polyethersulphone. The fine particles used dissolve in the bulk resin at the time of the prepreg curing, to form a thermoplastic resin layer, and the toughness of the composite material is enhanced by this. However, in these technologies, since there is employed a means in which thermoplastic resin fine particles dissolve in the bulk resin, the internal state of the finally-formed fibre-reinforced composite material, and in particular the interlaminar thickness between the layers of composite material comprising prepreg or the like, is markedly influenced by changes in the fabrication conditions such as the pressure and the rate of temperature rise, and so there is the disadvantage that the properties of the composite materials obtained are unstable.

Now, in the case of aircraft structural materials or interior materials, from the point of view of reducing weight there has been increasing use of honeycomb sandwich panels in which the skin panels are fibre-reinforced composite materials. Here, the honeycomb sandwich panels are generally produced by so-called co-cure fabrication, in which there is used an aramid honeycomb, glass honeycomb or aluminium honeycomb as the honeycomb core, and prepregs for forming the skin panels are laid on both faces thereof, after which the curing of the resin and adhesion to the honeycomb core are simultaneously effected.

In said co-cure fabrication, hitherto there has mostly been used a fabrication method in which an adhesive film is interposed between the honeycomb core and prepreg laminate but, recently, from the point of view of further reducing the weight of the honeycomb sandwich panel and lowering cost, there has been a demand for a so-called self-adhesive technology in which the honeycomb core and the prepreg are directly affixed. However, in cases where no adhesive film is used, the resin contained in the prepreg needs to bear the burden of adhesion to the honeycomb core, and so it has been difficult to ensure good adhesion.

As a honeycomb fabrication method relating to prepreg in which carbon fibre is the reinforcing fibre, and relating to the matrix resin, U.S. Pat. No. 4,500,660 discloses an epoxy resin composition which contains the reaction product of a specified epoxy resin and a butadiene-acrylonitrile copolymer with functional groups at both terminals, plus dicyandiamide as a curing agent, for the purposes of improving the peel strength to the honeycomb core and the interlaminar shear strength in terms of the skin panels. However, while it is possible by the technology described in U.S. Pat. No. 4,500,660 to maintain, to a certain degree, high levels of room temperature strength properties such as tensile strength in the composite material obtained, the peel strength between the prepreg and the honeycomb core is still inadequate and there is the disadvantage of poor wet heat resistance.

The present invention aims to offer fibre-reinforced composite materials which can be used favourably in applications where high level properties are demanded in a hot and wet environment in particular, and which are outstanding in their impact resistance and various characteristics of strength such as tensile strength, compression strength and interlaminar delamination strength; and also an epoxy resin composition and prepreg with outstanding handling properties which can be suitably employed in the production of such fibre-reinforced composite materials; and prepreg which is outstanding in its peel strength to a honeycomb core.

DISCLOSURE OF THE INVENTION

In order to overcome the aforesaid problems, the present invention has the following constitution. That is to say, it is an epoxy resin composition for a fibre-reinforced composite material, where the glass transition temperature Tg of the cured material obtained by heating for 2 hours at 180° C. is at least 150° C., and the modulus of rigidity $G'_R$ in the rubbery plateau in the temperature region above the aforesaid Tg is no more than 10 MPa.

Furthermore, in order to resolve the aforesaid problems the present invention also has the following constitution. Specifically, it is a prepreg formed by the impregnation of reinforcing fibre with an epoxy resin composition which includes the following constituents [A], [B] and [C], plus curing agent, and the respective contents per 100 parts by weight of the total epoxy resin in said resin composition are 5 to 35 parts by weight of constituent [A] and 50 to 95 parts by weight of constituent [B], and at least 90% of the constituent [C] is contained within a depth, from the prepreg surface, of 20% of the average prepreg thickness.

[A] trifunctional epoxy resin and/or tetrafunctional epoxy resin

[B] difunctional epoxy resin

[C] fine particles of average particle size 3 to 70 μm which are substantially insoluble in the epoxy resin of the aforesaid resin composition.

EXPLANATION OF THE NUMERICAL CODES

Figure 1:
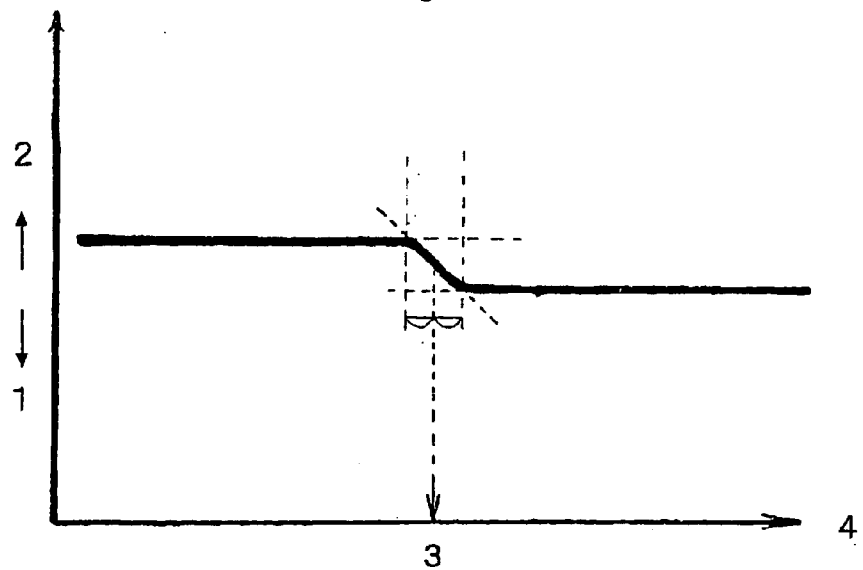
FIG. 1: A conceptual diagram of the Tg measurement by DSC

1: endotherm direction
2: exotherm direction
3: glass transition temperature Tg
4: temperature
5: modulus of rigidity G
6: glassy region
7: glass transition region
8: rubbery region
9: rubbery plateau modulus of rigidity $G'_R$
10: temperature
11: line segments
12: interlaminar region
13: thickness of composite material layer
14: standard 0° layer
15: set range

Optimum Form for Practising the Invention

As a result of a painstaking investigation the present inventors have found that, by employing an epoxy resin composition where the glass transition temperature Tg of the cured material obtained by heating said epoxy resin composition for 2 hours at 180° C. (hereinafter this is just referred to as the Tg) is above a specified temperature, and the modulus of rigidity $G'_R$ for the rubbery plateau in the temperature region above the aforesaid Tg of the cured material is below a specified temperature, the aforesaid problems associated with the fibre-reinforced composite material impact resistance and resistance to hot-wet environmental condition, the enhancement of various measures of strength such as the interlaminar delamination strength and the enhancement of the adhesive strength to the honeycomb core, are all resolved.

Furthermore, while the tensile strength of a fibre-reinforced composite material in the fibre direction (hereinafter referred to as the 0° tensile strength) is generally greatly dependent on the tensile strength of the reinforcing fibre itself, it is usually lower than the value calculated from the strand tensile strength of the reinforcing fibre itself. However, the present inventors have discovered that, by employing the aforesaid resin composition of the present invention as the matrix resin for a prepreg or composite material, the inherent strength characteristics of the reinforcing fibre may be fully utilized and, in the composite material obtained, the 0° tensile strength is markedly enhanced.

In the present invention, the Tg is the value measured by means of a differential scanning calorimeter (DSC) method as described below, and it needs to be at least 150° C., preferably at least 160° C. and more preferably at least 165° C. If it is less than 150° C., then the heat resistance of the composite material obtained will be inadequate. Furthermore, from the point of view of the composite material impact resistance, tensile strength and other measures of strength, and the resistance to peeling from a honeycomb core (referred to below merely as the peel strength), it is preferred that the Tg be less than 210° C. and desirably less than 200° C. Again, in the present invention, $G'_R$ is the value of the modulus of rigidity measured in the rubbery plateau in the temperature region above the Tg by dynamic mechanical analysis (DMA) as described below, and it needs to be no more than 10 MPa, preferably no more than 9 MPa and more preferably no more than 8 MPa. If it exceeds 10 MPa, then in the composite material obtained, the impact resistance, the strength characteristics such as the tensile strength, and the peel strength from a honeycomb core, are reduced.

Furthermore, from the point of view of enhancing the impact resistance, the strength characteristics such as tensile strength, and the peel strength from a honeycomb core, it is preferred that there be used an epoxy resin composition where the tensile breaking strain of the resin cured material is at least 8%. More preferably, there is used an epoxy resin composition where the tensile breaking strain is at least 10%.

From the point of view of enhancing the composite material compression characteristics, shear characteristics and the peel strength from a honeycomb core, it is preferred that the amount of epoxy resin incorporated in the epoxy resin composition of the present invention be at least 55 wt %, preferably at least 65 wt % and more preferably at least 75 wt %, in terms of the total 100% of resin composition.

As an epoxy resin, there is preferably used a difunctional epoxy resin with two epoxy groups per molecule, and as examples of the difunctional epoxy resins which can be used there are the bisphenol A type epoxy resins and bisphenol F type epoxy resins, and biphenyl type epoxy resins, naphthalene type epoxy resins, dicyclopentadiene type epoxy resins and diphenylfluorene type epoxy resins which give rigid resins of good resistance to hot-wet environmental condition, or combinations of these. In the present invention, the difunctional epoxy resin is constituent [B].

Examples of the bisphenol A type epoxy resins which can be used include Epikote 827 (epoxy equivalent: 180–190), Epikote 828 (epoxy equivalent: 184–194), Epikote 1001 (epoxy equivalent: 450–500), Epikote 1004 (epoxy equivalent: 875–975) (registered trade names; produced by Yuka Shell Epoxy K.K.), YD128 (epoxy equivalent: 184–194) (produced by the Toto Chemical Co.), Epiclon 840 (epoxy equivalent: 180–190), Epiclon 850 (epoxy equivalent: 184–194), Epiclon 855 (epoxy equivalent: 183–193), Epiclon 860 (epoxy equivalent: 230–270), Epiclon 1050 (epoxy equivalent: 450–500) (registered trade names; produced by Dainippon Ink & Chemicals Inc.), ELA 128 (epoxy equivalent: 184–194) (produced by the Sumitomo Chemical Co.) and DER331 (epoxy equivalent: 184–194) (produced by the Dow Chemical Co.).

Examples of the bisphenol F type epoxy resins which can be used include Epiclon 830 (epoxy equivalent: 165–185) (registered trade name; produced by Dainippon Ink & Chemicals Inc.) and Epikote 807 (epoxy equivalent: 160–175) (registered trade name; produced by Yuka Shell Epoxy K.K.).

Furthermore, as a biphenyl type epoxy resin there can be used YX4000 (epoxy equivalent: 180–192) (produced by Yuka Shell Epoxy K.K.), as a naphthalene type epoxy resin there can be used HP-4032 (epoxy equivalent: 140–150) (produced by Dainippon Ink & Chemicals Inc.), as a dicyclopentadiene type epoxy resin there can be used EXA-7200 (epoxy equivalent: 260–285) (produced by Dainippon Ink & Chemicals Inc.), and as a diphenylfluorene type epoxy there can be used EPON HPT1079 (epoxy equivalent: 250–260) (trade name; produced by Shell).

In the present invention, in order to produce a cured material which is rigid and has good resistance to hot-wet environmental condition, there is preferably used as epoxy resin an epoxy resin which is at least trifunctional, having three or more epoxy groups per molecule.

In the present invention, a trifunctional epoxy resin and/or tetrafunctional epoxy resin constitutes constituent [A].

As trifunctional epoxy resins or tetrafunctional epoxy resins, there can be used for example phenol novolak type epoxy resins, cresol novolak epoxy resins, glycidylamine type epoxy resins such as tetraglycidyl diaminodiphenylmethane, triglycidyl aminophenol or triglycidyl aminocresol, glycidyl ether type epoxy resins such as tetrakis(glycidyloxyphenyl)-ethane or tris(glycidyloxy) methane, or mixtures thereof.

As phenol novolac type epoxy resins, there can be used for example Epikote 152 (epoxy equivalent: 172–179) or Epikote 154 (epoxy equivalent: 176–181) (registered trade names; produced by Yuka Shell Epoxy K.K.), DER438 (epoxy equivalent: 176–181) (produced by Dow Chemical Co.), EPN1138 (epoxy equivalent: 176–181) or 1139 (epoxy equivalent: 172–179) (trade names, produced by Ciba Geigy).

As cresol novolac type epoxy resins, there can be used for example ESCN220L (epoxy equivalent: 200–230) (produced by the Sumitomo Chemical Co.), Epikote 180S65 (epoxy equivalent: 205–220) (registered trade name, produced by Yuka Shell Epoxy K.K.), or ECN1273 (epoxy equivalent: 225) (produced by Ciba Geigy).

As the tetraglycidyl diaminodiphenylmethane, there can be used for example ELM434 (produced by the Sumitomo Chemical Co.), YH434L (produced by the Toto Chemical Co.), or Epikote 604 (registered trade name, produced by Yuka Shell Epoxy K.K.).

As the triglycidyl aminophenol or triglycidyl aminocresol, there can be used ELM100 (produced by the Sumitomo Chemical Co.), MY0510 (produced by Ciba Geigy), Epikote 630 (registered trade name, produced by Yuka Shell Epoxy K.K.) or the like.

In the present invention, it is preferred that there be included the following percentages by weight of the epoxy resins, namely constituent [A] and constituent [B], per 100 wt % of total epoxy resin.

[A] trifunctional epoxy resin and/or tetrafunctional epoxy resin 5 to 35 wt %

[B] difunctional epoxy resin 50 to 95 wt %

If there is less than 5 wt % of [A], then the wet heat resistance of the composite material obtained may be reduced, while if the amount exceeds 35 wt % then the 0° tensile strength and the edge delamination strength (EDS) of the composite material obtained may be lowered. From this point of view, the amount of [A] component more preferably lies in the range 5 to 25 wt %.

Furthermore, with regard to [B], if the amount thereof is less than 50 wt %, then the 0° tensile strength and the edge delamination strength (EDS) of the composite material obtained may be lowered, while if it exceeds 95 wt % then the wet heat resistance of the composite material obtained may be reduced. From this point of view, in the present invention the amount of [B] component more preferably lies in the range 70 to 95 wt %.

Now, as well as the aforesaid polyfunctional epoxy resins, there may also be used a small amount of monofunctional epoxy resin having only one epoxy group in the molecule, providing this is within a range that does not impair the resistance to hot-wet environmental condition.

The curing agent for epoxy resin used in the present invention is not particularly restricted providing it is a compound having active groups, which can react with epoxy groups. Specific examples are aromatic amines such as diaminodiphenylmethane and diaminodiphenylsulphone, aliphatic amines, imidazole derivatives, dicyandiamide, tetramethylguanidine, thiourea-added amines, carboxylic acid anhydrides such as methylhexahydrophthalic anhydride, carboxylic acid hydrazides, carboxylic acid amides, polyphenol compounds, novolak resins, polymercaptans and the like. Furthermore, as a curing catalyst jointly used with the curing agent, there can be employed for example a so-called Lewis acid complex such as the boron trifluoride ethylamine complex. Now, where these curing agents are micro-encapsulated, the storage stability of the intermediate substrate material such as the prepreg is improved in, so this may be favourably employed.

A suitable curing accelerator can be used in combination with these curing agents to enhance the curing activity. Specifically, there can be cited the example of the use of an imidazole derivative or a urea derivative such as 3-(3,4-dichlorophenyl)-1,1-dimethylurea (DCMU) as a curing accelerator in combination with dicyandiamide, and the example of the use of a tertiary amine as a curing accelerator in combination with a carboxylic acid anhydride or a novolak resin.

For the purposes of adjusting the viscosity of the resin composition or enhancing the storage stability, there may also be incorporated into the resin composition a compound obtained by preliminary reaction between the epoxy resin and curing agent.

In the present invention, it is appropriate to incorporate into the resin composition from 1 to 20 wt % and preferably 2 to 10 wt % of bisphenol compound per 100 wt % of the total epoxy resin. With less than 1 wt %, the peel strength, and the tensile strength of the composite material obtained, may be lowered, while with more than 20 wt % the tackiness of the prepreg may be lowered and the resistance to hot-wet environmental condition and compression strength of the composite material obtained may be reduced.

Examples of the bisphenol compound here are bisphenol A, bisphenol F, bisphenol S, bisphenol AD, bisphenol Z, bisphenolfluorene and dihydroxybiphenyl, and alkyl- or halogen-substituted such compounds may also be favourably employed. Furthermore, as the bisphenol compound there can also be used dihydroxynaphthalene, dihydroxyanthracene or the like. Of these, bisphenol S is outstanding in terms of its effect in enhancing the peel strength, the composite material tensile strength, and the resistance to hot-wet environmental condition and elongation of the cured material obtained by heating the resin composition (this is referred to below just as the cured material), and so it is preferred.

In the present invention, it is possible to incorporate a thermoplastic resin into the resin composition in order to provide the effects of enhancing the physical properties demanded of the cured material such as toughness and suppressing the occurrence of defects such as voids in low pressure fabrication. Examples of the thermoplastic resins are those with bonds in the main chain selected from carbon-carbon bonds, amide bonds, imide bonds (for example polyetherimides), ester bonds, ether bonds, siloxane bonds, carbonate bonds, urethane bonds, urea bonds, thioether bonds, sulphone bonds, imidazole bonds and carbonyl bonds. Of these, thermoplastic resins with sulphone bonds such as polyethersulphones are preferred from the point of view of enhancing the resistance to hot-wet environmental condition, the impact resistance and the adhesion to the reinforcing fibre in the case of the cured material or composite material obtained.

Now, the thermoplastic resin may also be a so-called oligomer. In such circumstances, from the point of view of preventing excessive resin viscosity at the time of fabrication and preventing impaired flow properties, the number average molecular weight of the oligomer should be no more than 10,000, and preferably no more than 7,000. Furthermore, from the point of view of the modification effect by the thermoplastic resin and maintaining the impact resistance of the composite material obtained, the number average molecular weight of the oligomer should be at least 3,000 and preferably at least 4,000. Again, the oligomer preferably has, at the terminals or within the molecular chain, functional groups which can react with the thermosetting resin. As examples of such thermoplastic resin oligomers, there are those which combine heat resistance and toughness such as polysulphone, polyethersulphone, polyetherimide, polyimide, polyamide, polyamideimide and polyphenylene ether.

There should be incorporated 5 to 20 parts by weight and preferably 8 to 15 parts by weight of the thermoplastic resin per 100 parts by weight of total epoxy resin. If there is less than 5 parts by weight, then the toughness of the cured material may be insufficient, while if the amount exceeds 20 parts by weight then the resin flow properties may be impaired.

In the present invention, resin fine particles can be incorporated into the resin composition in order to enhance the peel strength, and the impact resistance of the composite material obtained. Fine particles of average particle size 3 to 70 $\mu$m, and which are substantially insoluble in the epoxy resin of the aforesaid resin composition, are constituent [C] of the present invention.

It is necessary that, in the composite material fabricating process, constituent [C] be substantially insoluble in the epoxy resin of the resin composition containing constituents [A] and [B]. Here, "substantially insoluble" means that, within the range from room temperature 25° C. up to the epoxy resin curing temperature, the proportion thereof dissolved-out into the fluid resin composition produced by uniformly mixing together the epoxy resins of the resin composition containing aforesaid constituents [A] and [B] is less than 10 wt %, preferably less than 5 wt %, and more preferably less than 2 wt %, in terms of the total 100 wt % of constituent [C].

The fine particles of constituent [C] will appropriately have an average particle size in the range 3 to 70 $\mu$m prior to incorporation into the resin composition, but there can be employed any fine particles the average particle size of which remains in the range 3 to 70 $\mu$m as a result of swelling in the composite material fabrication process or as a result of the dissolving-away into the bulk resin of a very small amount of the surface.

Insofar as they are substantially insoluble in the epoxy resin of the resin composition, constituent [C] may be organic fine particles comprising an organic material or they may be inorganic fine particles comprising metal or inorganic material but, from the point of view of the affinity to the bulk resin, organic fine particles are preferred.

In particular, thermoplastic resin fine particles or thermosetting resin fine particles are preferably used as the fine particles. As thermoplastic resin fine particles, there are those comprising thermoplastic resins having in the main chain bonds selected from carbon-carbon bonds, amide bonds, imide bonds, siloxane bonds, ester bonds, ether bonds, carbonate bonds, urethane bonds, urea bonds, thioether bonds, sulphone bonds, imidazole bonds and carbonyl bonds, examples of which are polyamide, polycarbonate, polyacetal, polyphenylene oxide, polyphenylene sulphide, polyarylate, polyester, polyamideimide, polyetherimide, polysiloxane, polysulphone, polyethersulphone, polyetheretherketone, polyaramid, polybenzimidazole, polyacrylate, polystyrene, polymethyl methacrylate (PMMA), benzoguanamine/melamine and the like.

It is preferred that the thermoplastic resin fine particles have at least a partially crystalline structure and/or crosslinked structure. In this way, dissolution in the bulk resin is reduced and the form of the particles is readily maintained in the matrix resin of the composite material.

Furthermore, specific examples of the thermosetting resin fine particles are fine particles of one or more type selected from the group comprising phenolic resins, epoxy resins, melamine resins, polyimide resins, maleimide resins, cyanate resins and furan resins. Of these, the epoxy resin fine particles are outstanding in their affinity to the bulk resin, while phenolic resin fine particles have high heat resistance, and so these are respectively preferred.

On the other hand, fine powdered silica is an example of inorganic fine particles. It is preferred that fine powdered silica be incorporated into the resin composition within a range such that the toughness and tensile elongation of the composite materials obtained are not impaired.

In the prepreg of the present invention, the aforesaid resin fine particles [C] should be located in the vicinity of the prepreg surface. In this way, the peel strength estimated from the compounding proportions is markedly exceeded and the impact resistance of the composite material obtained is enhanced. Here, "located in the vicinity of the surface" means that at least 90% of the resin fine particles contained in the resin composition are distributed within a depth, from the prepreg surface, comprising 20%, preferably 15% and more preferably 10% of the average thickness of the prepreg.

In this way, in the case where prepregs are laminated and the resin cured to produce a composite material, interlaminar regions between layers of cured prepreg, that is to say composite material layers and adjacent composite material layers, are readily formed and, as a result, the composite material obtained shows high EDS and impact strength.

As disclosed in U.S. Pat. No. 5,028,478, prepregs with resin fine particles localized at the surface can be produced by methods such as the method of putting the resin fine particles to the prepreg surface, the method of impregnating the reinforcing fibre with a resin composition in which the resin fine particles are uniformly blended, and the method of affixing a resin film containing a high concentration of resin fine particles to the prepreg surface.

The average particle size of the resin fine particle should be in the range from 3 to 70 $\mu$m, preferably 10 to 70 $\mu$m and more preferably 25 to 60 $\mu$m. If it is less than 3 $\mu$m, the fine particles will find their way into the gaps between reinforcing fibres, and in the composite material obtained the impact resistance enhancement effect will be diminished, while if it exceeds 70 $\mu$m, the arrangement of the reinforcing fibre will be disrupted and the interlaminar regions in the composite material obtained by lamination of the prepreg obtained will be thicker than necessary, so the properties of the composite material may be lowered.

The form of the resin fine particles may be that of a fine powder obtained by the pulverizing of resin, or may comprise particles obtained by the spray drying method or the re-precipitation method, and the fine particles may also be irregularly shaped as well as spherical. In addition, they may be porous, or they may be fibrous or needle shaped.

From the point of view of facilitating the mixing with the epoxy resin and preventing any lowering of the tack/drape properties of the prepreg obtained, there should be used from 1 to 15 wt % of the resin fine particles per 100 wt % of the total resin composition, and from the point of view of enhancing the impact strength, peel resistance, peel strength, and the compression strength of the composite material obtained, from 3 to 12 wt % is preferred.

Furthermore, in the present invention, for Theological control of the resin composition, inorganic fine particles such as finely powdered silica can be incorporated into the resin composition within a range such that the toughness and elongation of the cured material are not impaired. Again, a polymaleimide resin or resin with cyanate ester terminals can be incorporated within a range such that the toughness of the cured material is not impaired. Moreover, there can also be incorporated a monofunctional epoxy, an acrylate ester or other such reactive diluent, or an elastomer or other such modifier, within a range such that the wet heat resistance of the cured material is not impaired.

The polymaleimide used is, for example, a compound containing an average of at least two maleimide groups at the terminals, produced by the known method of reacting a diamine with an equivalent amount of unsaturated dicarboxylic acid anhydride. Furthermore, as the resin with cyanate ester terminals, there can be used the cyanate ester of a polyhydric phenol such as bisphenol A.

As elastomers, there can be used for example butadiene-acrylonitrile rubber, styrene-butadiene rubber or butyl acrylate.

In the prepreg of the present invention there is preferably used reinforcing fibre, which comprises continuous fibre. Moreover, the reinforcing fibre will preferably be outstanding in its wet heat resistance and tensile strength. Specific examples are carbon fibre, graphite fibre, aramid fibre, silicon carbide fibre, alumina fibre and boron fibre. Of these, carbon fibre and graphite fibre are preferred in that they are of excellent specific strength and specific elastic modulus, and they contribute markedly to a lowering of the weight of the composite material obtained. The carbon fibre or graphite fibre should have a tensile strength of 4.4 GPa or more, preferably 4.9 GPa or more, and the tensile elongation should be at least 1.5% and preferably at least 2.0%.

The reinforcing fibre comprising continuous fibre should have a fibre length of at least 5 cm and preferably at least 7 cm. If it is less than 5 cm, then the strength properties of the composite material obtained may be lowered.

The form of the reinforcing fibre may be that of unidirectionally-oriented fibre or randomly-oriented fibre, or sheet-shape, mat-shape, woven, braided or the like. Of these, unidirectionally-oriented fibre is favourable from the point of view of obtaining composite material with outstanding specific strength and specific elastic modulus, while in the case of the production of the skin panels of a honeycomb sandwich panel via prepregs, woven material is preferred in terms of the ease of handling and excellent peel strength.

The fibre-reinforced material of the present invention can be produced for example by laying-up the prepreg of the present invention as described above, in a specified shape, and then curing the resin by applying heat and pressure.

The fibre-reinforced composite material of the present invention is formed by the lamination of a plurality of layers of composite material comprising reinforcing fibre and aforesaid thermosetting resin, and the thickness of the interlaminar regions formed between the aforesaid composite material layers is preferably in the range 10 to 70 $\mu$m. If the interlaminar thickness is less than 10 $\mu$m then, while the rigidity possessed by the matrix resin contributes to the high performance of the compression strength of the fibre-reinforced composite material, there may at the same time be insufficient effect in enhancing the toughness between layers of fibre-reinforced composite material. If the interlaminar thickness exceeds 70 $\mu$m, the intralaminar fibre becomes too dense and, with the effects of stress concentration, there may be lowering of the tensile strength and compression strength.

In the present invention, as the honeycomb core, a Nomex honeycomb core comprising aramid paper impregnated with phenolic resin is preferred in that it is possible to form a high-strength structure while still being light in weight. With regard to the cell size of the honeycomb core, there can be favourably employed material of cell size 3 to 19 mm. In addition, it is also possible to use an aluminium honeycomb, a glass fibre-reinforced plastic (GFRP) honeycomb, a graphite honeycomb, a paper honeycomb or the like.

The honeycomb sandwich panel can be fabricated by a co-curing method in which a number of layers of prepreg are laid on both faces of the honeycomb core and, while curing the resin, adhesion to the honeycomb is effected. Again, the honeycomb sandwich panel can be fabricated by vacuum bag fabrication, autoclave fabrication using a vacuum bag, pressing or the like, but autoclave fabrication is preferred for obtaining a honeycomb sandwich panel of higher product quality and performance.

EXAMPLES

Below, the present invention is explained in still more specific terms by means of examples. In the examples and comparative examples, the following methods were employed for the production of the cured epoxy resin materials, the production of the prepregs, the production of the composite materials, and the measurement of the various properties.

<Glass Transition Temperature Tg of the Cured Material>

This is measured by a differential scanning calorimetry (DSC) method. The resin composition is heated for 2 hours at 180° C. and the cured material obtained is employed as the measurement sample. The DSC curve is obtained at a rate of temperature rise of 10° C./minute.

Next, as shown in FIG. 1, from the DSC curve the temperature at the point of intersection of the base line tangent and the endotherm tangent is obtained, and so too the temperature at the end point of the endotherm is obtained. The Tg is taken as the mid-point between these two values.

Here, as the measurement instrument, there is used a DSC2910 (model number) made by TA Instruments.

<The Modulus of Rigidity $G'_R$ in the Rubbery Plateau of the Cured Material>

Figure 2:
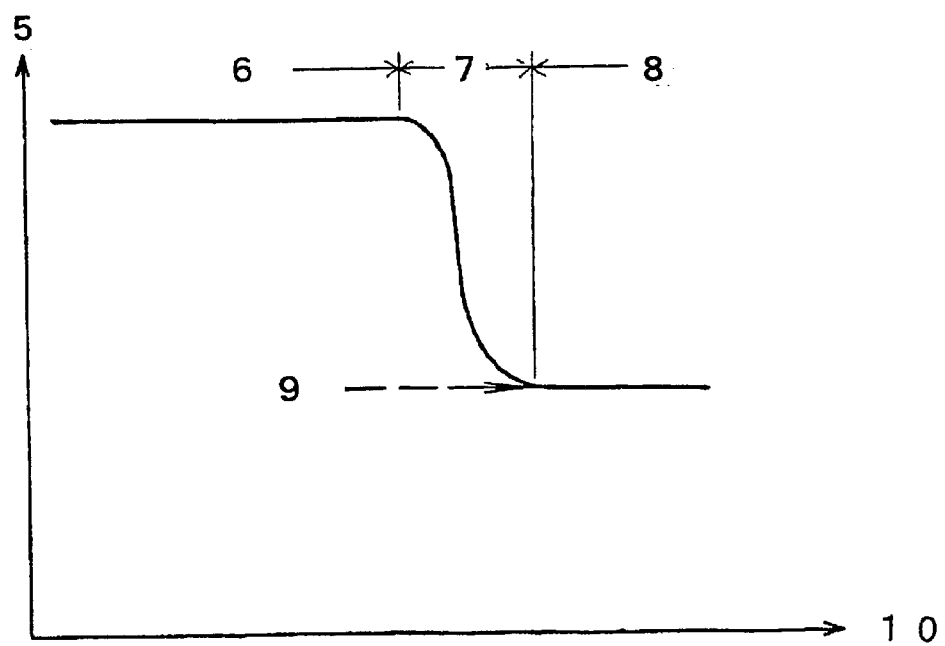
FIG. 2: A conceptual diagram of the $G'_R$ measurement by DMA

This is measured by dynamic mechanical analysis (DMA). There is employed a sheet-shaped moulded material (thickness 2 mm and width 10 mm) obtained by injecting the resin composition into a frame, which has been given a suitable mould-release treatment, and then heating for 2 hours at 180° C. Evaluation is performed by DMA under conditions comprising a span length of 40 mm, rate of temperature rise of 5° C./minute, torsional vibration frequency 0.5 Hz and strain 0.1%. In this evaluation method, the torsional rigidity G of the resin is measured in the region from the Tg extending to the rubbery plateau, as shown in FIG. 2. The torsional rigidity G in the rubbery plateau which is shown following damping of the torsional rigidity G by the glass transition is taken as $G'_R$.

Here, the measurement instrument used is a viscoelastic measurement system "Ares" (model name) produced by Rheometric Scientific.

<Tensile Breaking Strain of the Cured Material>

The resin composition is injected into a frame which has been given a suitable mould-release treatment, and then curing carried out by heating for 2 hours at 180° C. in an oven to produce a sheet-shaped cured material of thickness 2 mm.

Next, from this cured material, in accordance with the method described in JIS K7113, there is produced a test-piece by means of a dumbbell type test-piece processing machine, and this test-piece is fitted to a strain gauge. Tensile testing is carried out at a rate of 1 mm/minute and the tensile breaking strain (%) determined.

<Production of a Prepreg>

The resin composition is coated onto release paper, to produce a resin film having a specified resin weight per unit area. The resin film is laid onto both faces of the reinforcing fibre and, while applying heat and pressure, impregnation by the resin composition is effected and a prepreg produced.

In the case of woven fabric prepregs, there is employed plain weave fabric CF6273H (woven material thickness 0.22 mm, fibre bundle width/thickness ratio 69.2, cover factor 99.7%) comprising the carbon fibre "Torayca (registered trade mark)" T700G-12K (number of fibres 12000, tensile strength 4.9 GPa, tensile modulus 240 GPa, tensile elongation 2.1%) made by Toray Industries Inc, or plain weave fabric C07373Z (woven material thickness 0.27 mm, fibre bundle width/thickness ratio 14.9, cover factor 93.3%) comprising the carbon fibre "Torayca" T300G-3K (number of fibres 3000, tensile strength 3.5 GPa, tensile modulus 230 GPa, tensile elongation 1.5%) made by Toray Industries Inc., to produce prepregs of fibre weight per unit area 193 g/m² and resin content 40 wt %.

In the case of unidirectional prepregs, there is used the carbon fibre "Torayca" T800G-12K (number of fibres 12000, tensile strength 5.9 GPa, tensile modulus 290 GPa, tensile elongation 2.0%) made by Toray Industries Inc., or the carbon fibre "Torayca" T300B-3K (number of fibres 3000, tensile strength 3.5 GPa, tensile modulus 230 GPa, tensile elongation 1.5%) made by Toray Industries Inc., to produce prepregs of fibre weight per unit area 190 g/m² and resin content 36 wt %. ps <0° Tensile Strength of the Laminates (the Composite Material)>

Unidirectional prepregs prepared by the above method are arranged in the fibre direction to produce a 6-ply laminate, and then fabrication is carried out in an autoclave under a pressure of 0.59 MPa for 2 hours at 180° C. after heating-up at 1.5° C./minute.

The 0° tensile strength (MPa) of this laminates is determined in accordance with JIS K7073.

<Compression Strength of the Laminates (the Composite Material>

Laminate of unidirectional prepreg, produced by the aforesaid method, is immersed for 2 weeks in hot water at 71° C. and, after thoroughly absorbing water, the compression strength CHW (MPa) is determined at 82° C. in accordance with JIS K7076 by compression loading from the fibre direction.

<Edge Delamination Strength EDS of Laminates (Composite Material)>

Ten sheets of unidirectional prepreg are laid in pseudo isotropic fashion in a (±25°/±25°/90°)s configuration, and a laminate produced by fabricating in an autoclave for 2 hours at 180° C. under a pressure of 0.59 MPa, after heating-up at 1. 5° C./minute.

When subjecting this laminate to tensile testing in accordance with JIS K7073, the strength when edge delamination is produced is measured and this is taken as the sheet edge delamination strength EDS (MPa).

<Compression Strength of Laminates (Composite Material) After Impact CAI>

24 sheets of unidirectional prepreg are laid in pseudo isotropic fashion in a (±45°/0°/−45°/90°)3s configuration, and a laminate produced by fabricating in an autoclave for 2 hours at 180° C. under a pressure of 0.59 MPa, after heating-up at 1.5° C./minute.

From this laminate, a sample of length 150 mm×width 100 mm is cut out, subjected to a drop-weight impact of 6.7

J/mm at the sample centre in accordance with ASTM D695, and the compression strength after impact CAI (MPa) determined.

<Prepreg Thickness>

The prepreg is affixed between two sheets of Teflon of smooth surface and then, over 7 days, the temperature is gradually raised to 150° C. to bring about gelling and curing, and a sheet-shaped cured material produced.

The cured material is cut from a direction perpendicular to the face affixed to the Teflon and, after polishing the cut face, a photograph is taken at a magnification of at least 200 with an optical microscope, in such a way that the upper and lower faces of the prepreg are within the field of view.

By this procedure, at five locations in the widthwise direction of the cross-sectional photograph, the spacing between the Teflon sheets is measured and the average (n=5) is taken as the prepreg thickness.

<Proportion of Fine Particles in the Prepreg>

For both faces of the prepreg, lines are drawn parallel to the prepreg surface at positions of depth corresponding to 20% of the thickness.

Next, in each case, the total area of the fine particles present between the line and the prepreg surface, and the total area of all the fine particles observed over the entire prepreg thickness, are respectively determined. Then, the proportion of fine particles present within a depth, from the prepreg surface, corresponding to 20% of the total 100% prepreg thickness, is calculated.

Here, the total area of the fine particles is determined by calculation from the weight when the fine particle regions are cut from the cross-sectional photograph.

Now, in cases where determination is difficult following photographing of the fine particles dispersed in the matrix resin, there may be employed a means for staining the fine particles.

<Amount of Resin Fine Particles Added>

By means of a solvent (here N-methylpyrrolidone was employed) which does not substantially dissolve the resin fine particles but does dissolve the matrix resin), only the matrix resin component is completely dissolved from a weighed amount of prepreg. The fine particles obtained by filtering the washing liquid with a filter of suitable pore size are weighed, and the amount of resin particles added is determined.

<Average Particle Size of the Resin Fine Particles>

The prepreg is immersed for 24 hours in N-methylpyrrolidone solvent for 24 hours at a room temperature of 25° C., and the resin dissolved out. Next, the solution is filtered using a filter of suitable pore size and the fine particles separated. Furthermore, the fine particles are washed with a sufficient amount of N-methylpyrrolidone. Thereafter, the fine particles are photographed at a magnification of at least 1000 using a scanning electron microscope and particles randomly selected. The average value (n=50) of the particle size (diameter of equivalent circle) is taken as the average particle size of the fine particles.

<Composite Material Layer (Single Layer) Thickness>

Using the aforesaid laminate, the laminate is cut perpendicular to the plane of lamination and, after polishing the cross-section, this is photographed at a magnification of at least 200 with an optical microscope in such a way that at least three of the composite material layers are within the field of view.

From this cross-sectional photograph, there is selected one composite material layer where the fibre axis layer is in the horizontal direction, and this is taken as the standard 0° layer. Between the composite material layers above and below the standard 0° layer, centre lines are drawn parallel to the fibre axis, and the spacing between these two centre lines is measured. This procedure is carried out in at least five locations in the laminate and the average (n=5) is taken as the thickness of the composite material layer (single layer).

<Interlaminar Thickness>

Figure 3:
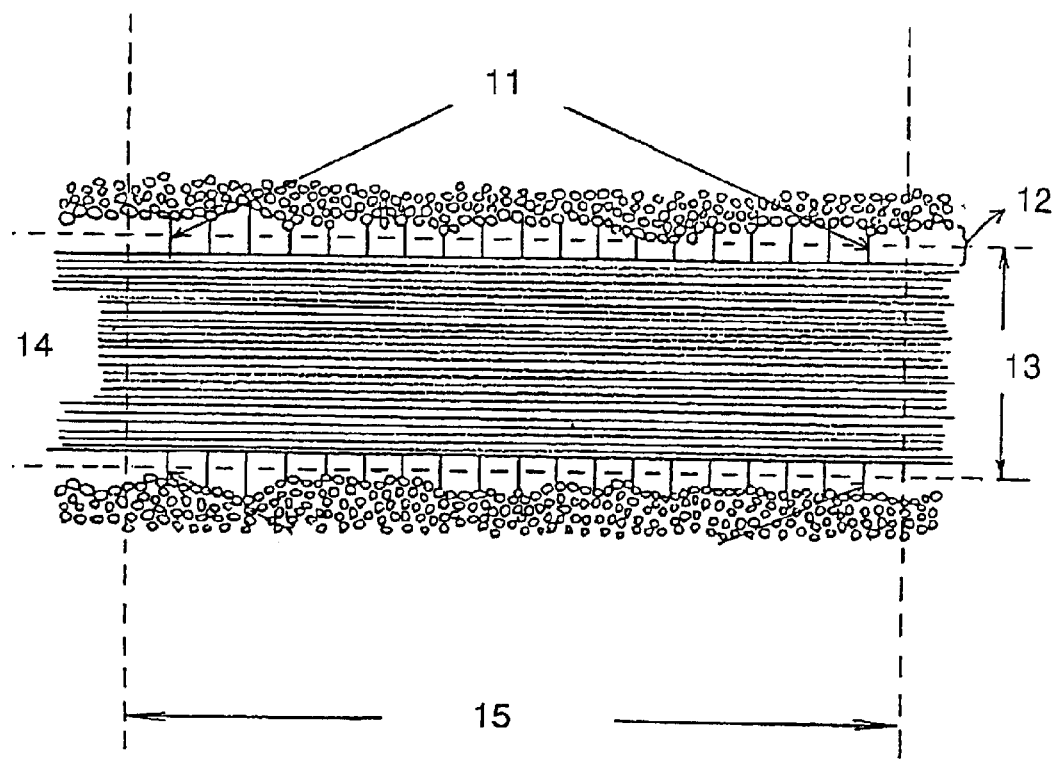
FIG. 3: A sectional schematic diagram (partial) of laminate

In the aforesaid cross-sectional photograph, in the interlaminar regions above and below the standard 0° layer, 19 equi-spaced lines are drawn (within a set range) perpendicular to the 0° fibre axis. For these lines, the average (n=38) of the lengths of the segments produced between the reinforcing fibre in the layers above or below the standard 0° layer and the reinforcing fibre in the standard 0° layer is taken as the interlaminar thickness (see the sectional schematic diagram in FIG. 3).

<Interlaminar State>

A laminate is produced by superimposing 24 sheets of prepreg in pseudo-isotropic fashion in a (±45°/0°/-45°/90°) 3s configuration, and fabrication is performed at 1.5° C./minute and keeping for 2 hours at 180° C. in an autoclave under a pressure of 0.59 MPa. The cross-section is then observed with an optical microscope and the state of the fine particles in the laminate interlayer regions is noted.

<CDP Between Skin Panel/honeycomb Core>

(1) Sample Lamination

As the honeycomb core there is used a Nomex honeycomb SAH1/8–8.0 (made by Showa Hikoki K.K., code: SAH1/8–8.0, thickness 12.7 mm). Furthermore, using the aforesaid woven material prepreg, a (±45°)/(±450°) two-ply symmetrical laminate structure is formed both above and below the honeycomb. The dimensions of the honeycomb and prepreg here are 40 cm (shortwise direction)×50 cm (longwise direction), and the prepreg is laminated such that the shortwise direction is the honeycomb core ribbon (L) direction and the prepreg warp direction.

(2) Sample Fabrication

The following procedures are employed.

(a) The unfabricated body comprising the prepreg superimposed on the honeycomb core is placed on an aluminium tool plate coated with release agent, for example "Freecoat" 44-NC (made by the Dexter Corporation).

(b) The unfabricated body is covered with nylon film and, with the region within the nylon film (referred to below as the system interior) maintained under a vacuum, it is then introduced into an autoclave.

(c) The pressure inside the autoclave is raised to 0.15 MPa and then the pressure inside the system is normalized. Next, the pressure inside the autoclave is raised to 0.30 MPa, after which heating is commenced.

(d) With the pressure inside the autoclave held as it is, at 0.30 MPa, until the fabrication is complete, the temperature is raised to 180° at 1.5° C./minute. It is then maintained at 180° C. for 2 hours and, while the resin is cured, adhesion to the honeycomb core is effected, after which the temperature is lowered at 2° C./minute, to produce the honeycomb co-cured fabricated body, that is to say the honeycomb sandwich panel.

(3) Measurement of the Climbing Drum Peel Strength (CDP)

A sample is cut from the aforesaid fabricated body and, in accordance with ASTM D1781, the CDP is measured between the honeycomb core and the skin panel on the aluminium tool plate side.

EXAMPLES 1 to 8

Comparative Example 1 and 2

In the examples and comparative examples, the following starting material resins were employed.

[Starting Material Resins]

tetraglycidyl diaminodiphenylmethane, MY720 (code name, produced by Ciba Geigy)

bisphenol A type epoxy resin, Epikote 825 (made by Yuka Shell Epoxy K.K., registered trade name)

bisphenol F type epoxy resin, Epiclon 830 (made Dainippon Ink & Chemicals Inc., registered trade name)

biphenyl type epoxy resin, Epikote YX4000H (made by Yuka Shell Epoxy K.K., registered trade name)

polyethersulphone, Victrex 100P (made by the Sumitomo Chemical Co., registered trade name)

polyetherimide, Ultem 1000 (Made by GE Plastics Japan, registered trade name)

bisphenol S (made by the Konishi Chemical Co.)

3,3'-diaminodiphenylsulphone (made by the Wakayama Seika Kogyo Co)

4,4'-diaminodiphenylsulphone, Sumicure S (made by the Sumitomo Chemical Co., registered trade name)

dicyandiamide, DICY7 (made by Yuka Shell Epoxy K.K., registered trade name)

3-(3,4-dichlorophenyl)-1,1-dimethylurea, DCMU99 (made by Hodogaya Chemical Co., trade name)

[Fine Particles]

crosslinked PMMA fine particles: Techpolymer MBX-20 (average particle size 20 µm), MBX-40 (average particle size 40 µm), MBX-8 (average particle size 8 µm) (trade names; produced by the Sekisui Plastics Co.

benzoguanamine/melamine resin fine particles, Epostar M30 (average particle size 3 µm) (made by the Nippon Shokubai Co., product code)

Resin compositions were prepared by kneading the aforesaid resins in a kneader based on the formulations shown in Table 1. Next, in accordance with the methods described above, laminates, prepregs and honeycomb sandwich panels were produced, and their properties evaluated. The details for each of the examples and comparative examples are shown together in Table 1.

It is clear that, in the case of Example 1 for example, when compared to Comparative Example 1 the 0° tensile strength, edge delamination strength EDS, compression strength after impact CAI and the climbing drum peel strength CDP, which is an index of the peel strength, are enhanced, and furthermore, the compression strength CHW which is an index of the wet heat resistance is maintained.

Furthermore, in Comparative Example 2, the Tg is less than 150° C. and, when compared to the examples, it is clear that the compression strength CHW which is an index of the wet heat resistance is markedly lowered and, furthermore, the 0° tensile strength, edge delamination strength EDS, compression strength after impact CAI and the climbing drum peel strength CDP are also unsatisfactory.

Industrial Application Potential

In accordance with the present invention, it is possible to provide a fibre-reinforced composite material which in particular can be used in applications where high level properties are demanded in a hot and wet environment, and which is outstanding in its impact resistance and strength characteristics such as tensile strength and compression strength, together with a thermosetting resin composition and a prepreg which can be suitably used in the production of this fibre-reinforced plastic material and which are outstanding in terms of their peel strength to a honeycomb core.

TABLE 1

|   |   |   | Examples | | | | |
|---|---|---|---|---|---|---|---|
|   |   |   | 1 | 2 | 3 | 4 | 5 |
| Matrix Resin | Composition (parts by weight) | [Epoxy Resin] | | | | | |
|   |   | tetraglycidyl diaminodiphenylmethane | 10 | 10 | 10 | 10 | 10 |
|   |   | bisphenol A type epoxy resin | 50 | 50 | 50 | 50 | 50 |
|   |   | bisphenol F type epoxy resin | 40 | 40 | 40 | 40 | 40 |
|   |   | biphenyl type epoxy resin | — | — | — | — | — |
|   |   | [Other Starting Material Resins] | | | | | |
|   |   | bisphenol S | — | — | 6 | 6 | 6 |
|   |   | polyethersulphone | — | — | — | — | — |
|   |   | polyetherimide | 8 | 8 | 8 | 8 | 8 |
|   |   | [Curing agent] | | | | | |
|   |   | 3,3'-diaminodiphenylsulphone | — | — | — | — | — |
|   |   | 4,4'-diaminodiphenylsulphone | 35 | 35 | 35 | 35 | 35 |
|   |   | dicyandiamide | — | — | — | — | — |
|   |   | 3-(3,4-dichlorophenyl)-1,1-dimethylurea (DCMU) | — | — | — | — | — |
|   |   | [Fine Particles] | | | | | |
|   |   | crosslinked PMMA fine particles (av. size 40 µm) | — | 7 | — | — | — |
|   |   | crosslinked PMMA fine particles (av. size 20 µm) | — | — | 7 | — | — |
|   |   | crosslinked PMMA fine particles (av. size 8 µm) | — | — | — | 7 | — |
|   |   | BG/melamine resin fine particles (av. size 3 µm) | — | — | — | — | 7 |
|   | glass transition temperature Tg (° C.) | | 164 | 164 | 168 | 167 | 165 |
|   | rubbery plateau modulus of rigidity $G'_R$ (MPa) | | 8.9 | 8.9 | 7.4 | 7.3 | 7.2 |
|   | tensile breaking strain (%) | | 11.2 | 10.1 | 14.3 | 14.4 | 14.6 |
| Unidirectional prepreg | carbon fibre type | | T800G | T800G | T800G | T800G | T800G |
|   | proportion of resin fine particles within 20% depth (%) | — | 99 | 95 | 80 | 54 | |
| Laminate (composite material) | 0° tensile strength (MPa) | | 3116 | 3181 | 3188 | 3186 | 3188 |
|   | hot wet compression strength CHW (MPa) | | 1296 | 1291 | 1295 | 1288 | 1293 |

TABLE 1-continued

|  |  |  | | | | | |
|---|---|---|---|---|---|---|---|
| | | edge delamination strength EDS (MPa) | 441 | 477 | 464 | 445 | 437 |
| | | compression strength after impact CAI (MPa) | 244 | 276 | 285 | 255 | 248 |
| | | interlaminar thickness (μm) | 6 | 49 | 33 | 9 | 7 |
| | | composite material layer (monolayer) thickness | 196 | 193 | 189 | 188 | 192 |
| Woven prepreg | | carbon fibre type | T700GC | T700GC | T700GC | T700GC | T700GC |
| | | proportion of resin fine particles within 20% depth (%) | — | 96 | 97 | 86 | 56 |
| Honeycomb sandwich panel | | climbing drum peel strength CDP (N.m/m) | 24 | 28 | 28 | 25 | 24 |

|  |  |  | Examples | | | Comp Examples | |
|---|---|---|---|---|---|---|---|
| | | | 6 | 7 | 8 | 1 | 2 |
| Matrix | Composition | [Epoxy Resin] | | | | | |
| Resin | (parts by weight) | tetraglycidyl diaminodiphenylmethane | 10 | 10 | 10 | 65 | 20 |
| | | bisphenol A type epoxy resin | — | — | 50 | 20 | 40 |
| | | bisphenol F type epoxy resin | 40 | 40 | 40 | 15 | 40 |
| | | biphenyl type epoxy resin | 50 | 50 | — | — | — |
| | | [Other Starting Material Resins] | | | | | |
| | | bisphenol S | 5 | — | 6 | — | — |
| | | polyethersulphone | 10 | 10 | — | — | 10 |
| | | polyetherimide | — | — | 8 | 8 | — |
| | | [Curing agent] | | | | | |
| | | 3,3'-diaminodiphenylsulphone | 33 | 33 | — | — | — |
| | | 4,4'-diaminodiphenylsulphone | — | — | 35 | 43 | — |
| | | dicyandiamide | — | — | — | — | 3 |
| | | 3-(3,4-dichlorophenyl)-1,1-dimethylurea (DCMU) | — | — | — | — | 3 |
| | | [Fine Particles] | | | | | |
| | | crosslinked PMMA fine particles (av. size 40 μm) | 10 | 10 | — | — | — |
| | | crosslinked PMMA fine particles (av. size 20 μm) | — | — | 7 | — | — |
| | | crosslinked PMMA fine particles (av. size 8 μm) | — | — | — | — | — |
| | | BG/melamine resin fine particles (av. size 3 μm) | — | — | — | — | — |
| | glass transition temperature Tg (° C.) | | 177 | 173 | 168 | 218 | 147 |
| | rubbery plateau modulus of rigidity G'$_R$ (MPa) | | 7.0 | 9.1 | 7.4 | 10.6 | 8.3 |
| | tensile breaking strain (%) | | 16.2 | 11.7 | 14.3 | 4.7 | 12.3 |
| Unidirectional prepreg | | carbon fibre type | T800G | T800G | T300B | T800G | T800G |
| | | proportion of resin fine particles within 20% depth (%) | 96 | 97 | 97 | — | — |
| Laminate (composite material) | | 0° tensile strength (MPa) | 3210 | 3185 | 2055 | 2751 | 3010 |
| | | hot wet compression strength CHW (MPa) | 1311 | 1320 | 1308 | 1310 | 910 |
| | | edge delamination strength EDS (MPa) | 513 | 472 | 440 | 352 | 355 |
| | | compression strength after impact CAI (MPa) | 290 | 278 | 284 | 205 | 208 |
| | | interlaminar thickness (μm) | 9 | 52 | 29 | 7 | 6 |
| | | composite material layer (monolayer) thickness | 193 | 191 | 193 | 199 | 198 |
| Woven prepreg | | carbon fibre type | T700GC | T700GC | T300B | T700GC | T700GC |
| | | proportion of resin fine particles within 20% depth (%) | 96 | 97 | 93 | — | — |
| Honeycomb sandwich panel | | climbing drum peel strength CDP (N.m/m) | 31 | 28 | 22 | 12 | 18 |

What is claimed is:

1. An epoxy resin composition for a fiber-reinforced composition material, which is an epoxy resin composition where the glass transition temperature Tg of the cured material obtained by heating for 2 hours at 180° C. is at least 150° C., and the modulus of rigidity G'$_R$ in the rubbery plateau in the temperature region above the aforesaid Tg is no more than 10 MPa.

2. An epoxy resin composition according to claim 1 where the tensile breaking strain of the cured material is at least 8%.

3. An epoxy resin composition according to claim 1 where there is included 5 to 35 parts by weight of trifunctional epoxy resin and/or tetrafunctional epoxy resin per 100 parts by weight of total epoxy resin.

4. An epoxy resin composition according to claim 1 where there is included 50 to 95 parts by weight of difunctional epoxy resin per 100 parts by weight of total epoxy resin.

5. The epoxy resin composition according to claim 1, wherein the epoxy resin composition includes a constituent (C), wherein constituent (C) comprises fine particles of average particle size 3 to 70 μm which are substantially insoluble in the epoxy resin of the epoxy resin composition.

6. An epoxy resin composition according to claim 5, wherein the average particle size of the fine particles of constituent (C) is in the range of 10 to 70 μm.

7. An epoxy resin composition according to claim 1, which contains 1 to 20 parts by weight of bisphenol compound per 100 parts by weight of the total epoxy resin.

8. A prepreg comprising continuous reinforcing fiber and the epoxy resin composition according to claim 1.

9. A prepreg comprising the epoxy resin composition according to claim 5, wherein at least 90% of constituent (C) is contained within a depth from the prepreg surface of 20% of the average prepreg thickness.

10. A prepreg comprising a reinforcing fiber impregnated in an epoxy resin composition, wherein the epoxy resin composition comprises the following constituents (A),(B) and (C):

(A) trifunctional epoxy resin and/or tetrafunctional epoxy resin;

(B) difunctional epoxy resin;

(C) fine particles of average particle size 10 to 70 μm which are substantially insoluble in the epoxy resin of the aforesaid resin composition;

and a curing agent, wherein the respective contents per 100 parts by weight of total epoxy resin in said resin composition are 5 to 35 parts by weight of constituent (A) and 50 to 95 parts by weight of constituent (B), and wherein at least 90% of constituent (C) is contained within a depth from the prepreg surface of 20% of the average prepreg thickness.

11. The prepreg according to claim 10, wherein the average particle size of the fine particles of constituent (C) is 25 to 60 µm.

12. The prepreg according to claim 8 or 10, wherein the reinforcing fiber is carbon fiber.

13. The prepreg according to claim 9 or 10, wherein constituent (C) is thermoplastic resin fine particles.

14. The prepreg according to claim 9 or 10, wherein constituent (C) has a crystalline structure and/or crosslinked structure.

15. The prepreg according to claim 9 or 10, wherein constituent (C) is thermosetting resin fine particles.

16. A fiber-reinforced composite material formed by laminating a plurality of prepregs according to claim 8 or claim 10.

17. The fiber-reinforced composite material according to claim 16, wherein interlaminar regions comprising a resin layer are formed between the plurality of prepregs and wherein the average thickness of the resin layer formed in the interlaminar regions is in the range 10 to 70 µm.

18. The fiber-reinforced composite material according to claim 16, wherein interlaminar regions are formed between the plurality of prepregs, and wherein the interlaminar regions comprise fine particles of average size 10 to 70 µm.

19. The fiber-reinforced composite material according to claim 18, wherein the average particle size of the particles 25 to 60 µm.

20. A honeycomb sandwich panel formed by laminating prepreg according to claim 8 or claim 10 on a honeycomb core and curing.

* * * * *

UNITED STATES PATENT AND TRADEMARK OFFICE
CERTIFICATE OF CORRECTION

PATENT NO. : 6,596,373 B1
DATED : July 22, 2003
INVENTOR(S) : Hajime Kishi et al.

It is certified that error appears in the above-identified patent and that said Letters Patent is hereby corrected as shown below:

<u>Column 20,</u>
Line 11, after "average" insert -- particle --,
Line 13, before the second "particles" insert -- fine --,
Line 13, after the second "particles" insert -- is --.

Signed and Sealed this

Twentieth Day of January, 2004

JON W. DUDAS
*Acting Director of the United States Patent and Trademark Office*